United States Patent
Xu et al.

(10) Patent No.: US 9,083,196 B2
(45) Date of Patent: Jul. 14, 2015

(54) CIRCUITS AND METHODS FOR HEATING BATTERIES IN PARALLEL USING RESONANCE COMPONENTS IN SERIES

(71) Applicant: BYD Company Limited, Shenzhen (CN)

(72) Inventors: Wenhui Xu, Shenzhen (CN); Yaochuan Han, Shenzhen (CN); Wei Feng, Shenzhen (CN); Qinyao Yang, Shenzhen (CN); Wenjin Xia, Shenzhen (CN); Shibin Ma, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 353 days.

(21) Appl. No.: 13/747,378

(22) Filed: Jan. 22, 2013

(65) Prior Publication Data
US 2013/0141032 A1 Jun. 6, 2013

Related U.S. Application Data

(63) Continuation-in-part of application No. 13/187,874, filed on Jul. 21, 2011, now Pat. No. 8,829,856.

(30) Foreign Application Priority Data

| Jul. 30, 2010 | (CN) | 2010 1 0245288 |
|---|---|---|
| Aug. 30, 2010 | (CN) | 2010 1 0274785 |
| Dec. 23, 2010 | (CN) | 2010 1 0603669 |
| Dec. 23, 2010 | (CN) | 2010 1 0604677 |

(51) Int. Cl.
H02J 7/00 (2006.01)
H01M 10/615 (2014.01)
(Continued)

(52) U.S. Cl.
CPC ........... *H02J 7/007* (2013.01); *H01M 10/5006* (2013.01); *H01M 10/5016* (2013.01);
(Continued)

(58) Field of Classification Search
CPC ....... H02J 7/007; H02J 7/0093; H02J 7/0091; H01M 10/5083; H01M 10/5006
USPC .................................................. 320/103, 129
See application file for complete search history.

(56) References Cited

U.S. PATENT DOCUMENTS

| 3,654,426 A | 4/1972 | Brinkmann et al. |
| 3,808,481 A | 4/1974 | Rippel |

(Continued)

FOREIGN PATENT DOCUMENTS

| CN | 1630129 A | 6/2005 |
| CN | 1630130 A | 6/2005 |

(Continued)

OTHER PUBLICATIONS

United States Patent and Trademark Office, Notice of Allowance mailed Feb. 18. 2015, in related U.S. Appl. No. 13/168,004.

(Continued)

*Primary Examiner* — M'Baye Diao
(74) *Attorney, Agent, or Firm* — Jones Day

(57) ABSTRACT

Certain embodiments of the present invention provide a battery heating circuit, wherein: the battery comprises a first battery and a second battery; the heating circuit comprises a first switch unit, a second switch unit, a damping component R1, a damping component R2, a current storage component L3, a current storage component L4, a switching control module and an energy storage component V1; the first battery, the damping component R1, the current storage component L3, the energy storage component V1 and the first switch unit are connected in series to constitute a first charging/discharging circuit; the second battery, the damping component R2, the current storage component L4, the energy storage component V1 and the second switch unit are connected in series to constitute a second charging/discharging circuit.

20 Claims, 6 Drawing Sheets

(51) Int. Cl.
*H01M 10/625* (2014.01)
*H01M 10/657* (2014.01)
*H01M 10/6571* (2014.01)
*H02J 7/02* (2006.01)
*H02J 7/04* (2006.01)

(52) U.S. Cl.
CPC ...... *H01M10/5081* (2013.01); *H01M 10/5083* (2013.01); *H02J 7/022* (2013.01); *H02J 7/047* (2013.01); *H02J 7/0063* (2013.01)

(56) References Cited

U.S. PATENT DOCUMENTS

| | | |
|---|---|---|
| 4,171,508 A | 10/1979 | Sinclair |
| 4,184,197 A | 1/1980 | Cuk et al. |
| 4,222,000 A | 9/1980 | Silvertown et al. |
| 5,362,942 A | 11/1994 | Vanderslice, Jr. et al. |
| 5,396,165 A | 3/1995 | Hwang et al. |
| 5,461,556 A | 10/1995 | Horie et al. |
| 5,523,671 A | 6/1996 | Stewart |
| 5,561,597 A | 10/1996 | Limpaecher |
| 5,768,114 A | 6/1998 | Gruning et al. |
| 5,789,905 A | 8/1998 | Yamasaki |
| 5,808,469 A | 9/1998 | Kopera |
| 5,905,371 A | 5/1999 | Limpaecher |
| 5,943,224 A | 8/1999 | Mao |
| 5,948,298 A | 9/1999 | Ijaz |
| 5,990,661 A | 11/1999 | Ashtiani et al. |
| 6,002,240 A | 12/1999 | McMahan et al. |
| 6,072,301 A | 6/2000 | Ashtiani et al. |
| 6,078,163 A | 6/2000 | Horie et al. |
| 6,142,130 A | 11/2000 | Ward |
| 6,211,652 B1 | 4/2001 | Glasgow |
| 6,259,229 B1 | 7/2001 | Ashtiani et al. |
| 6,340,879 B1 * | 1/2002 | Blacker .................. 320/153 |
| 6,771,518 B2 | 8/2004 | Orr et al. |
| 6,882,061 B1 | 4/2005 | Ashtiani et al. |
| 7,292,010 B2 | 11/2007 | Hsu et al. |
| 7,382,102 B2 | 6/2008 | Ashtiani |
| 7,402,982 B2 | 7/2008 | Ito et al. |
| 7,876,583 B2 | 1/2011 | Polivka et al. |
| 8,004,866 B2 | 8/2011 | Bucella et al. |
| 8,197,502 B2 | 6/2012 | Smith et al. |
| 8,493,036 B2 | 7/2013 | Ferrario |
| 8,829,856 B2 * | 9/2014 | Xu et al. ................. 320/129 |
| 8,941,358 B2 * | 1/2015 | Xu et al. ................. 320/128 |
| 8,975,872 B2 * | 3/2015 | Xu et al. ................. 320/128 |
| 2005/0077879 A1 * | 4/2005 | Near .................. 320/166 |
| 2005/0156578 A1 | 7/2005 | Kamenoff |
| 2005/0168195 A1 | 8/2005 | MacDougall |
| 2005/0264237 A1 | 12/2005 | Ishizuka |
| 2007/0024243 A1 | 2/2007 | Liu et al. |
| 2007/0091023 A1 | 4/2007 | Kosaka et al. |
| 2007/0121258 A1 | 5/2007 | Hachiya |
| 2009/0014436 A1 | 1/2009 | Toya et al. |
| 2009/0243547 A1 | 10/2009 | Andelfinger |
| 2011/0095711 A1 | 4/2011 | Hsieh et al. |
| 2011/0144861 A1 | 6/2011 | Lakirovich et al. |
| 2011/0273136 A1 | 11/2011 | Yoshimoto |
| 2012/0024838 A1 | 2/2012 | Xu et al. |
| 2012/0025754 A1 | 2/2012 | Xu et al. |
| 2012/0025755 A1 | 2/2012 | Xu et al. |
| 2012/0025756 A1 | 2/2012 | Xu et al. |
| 2012/0025772 A1 | 2/2012 | Xu et al. |
| 2012/0025774 A1 | 2/2012 | Xu et al. |
| 2012/0025775 A1 | 2/2012 | Xu et al. |
| 2012/0025776 A1 | 2/2012 | Xu et al. |
| 2012/0025777 A1 | 2/2012 | Xu et al. |
| 2012/0025778 A1 | 2/2012 | Xu et al. |
| 2012/0025779 A1 | 2/2012 | Xu et al. |
| 2012/0025780 A1 | 2/2012 | Xu et al. |
| 2012/0025781 A1 | 2/2012 | Xu et al. |
| 2012/0025782 A1 | 2/2012 | Xu et al. |
| 2012/0025783 A1 | 2/2012 | Xu et al. |
| 2012/0031890 A1 | 2/2012 | Han et al. |
| 2012/0032642 A1 | 2/2012 | Xu et al. |
| 2012/0126753 A1 | 5/2012 | Carkner |
| 2012/0161711 A1 | 6/2012 | Xu et al. |
| 2012/0279951 A1 | 11/2012 | Xu et al. |
| 2012/0280658 A1 | 11/2012 | Xu et al. |
| 2012/0280659 A1 | 11/2012 | Xu et al. |
| 2012/0299551 A1 | 11/2012 | Xu et al. |
| 2012/0306432 A1 | 12/2012 | Xu et al. |
| 2013/0127398 A1 | 5/2013 | Xu et al. |
| 2013/0134146 A1 | 5/2013 | Han et al. |
| 2013/0134945 A1 | 5/2013 | Xu et al. |

FOREIGN PATENT DOCUMENTS

| | | |
|---|---|---|
| CN | 1809942 A | 7/2006 |
| CN | 1836356 A | 9/2006 |
| CN | 1291518 C | 12/2006 |
| CN | 101552479 A | 10/2009 |
| CN | 201397868 Y | 2/2010 |
| CN | 101685971 A | 3/2010 |
| CN | 201435426 Y | 3/2010 |
| CN | 201667552 U | 12/2010 |
| CN | 102055042 A | 5/2011 |
| CN | 102074756 A | 5/2011 |
| CN | 201936966 U | 8/2011 |
| CN | 201936967 U | 8/2011 |
| CN | 201936969 U | 8/2011 |
| CN | 201966300 U | 9/2011 |
| CN | 202009059 U | 10/2011 |
| CN | 202042567 U | 11/2011 |
| CN | 202076380 U | 12/2011 |
| CN | 202103139 U | 1/2012 |
| CN | 202121024 U | 1/2012 |
| CN | 102074755 B | 5/2012 |
| CN | 102074758 B | 6/2012 |
| CN | 102074759 B | 6/2012 |
| CN | 102074753 B | 7/2012 |
| CN | 102074756 B | 7/2012 |
| CN | 102074760 B | 7/2012 |
| CN | 102074762 B | 7/2012 |
| CN | 102074761 B | 9/2012 |
| CN | 102088117 B | 9/2012 |
| CN | 102082306 B | 11/2012 |
| CN | 102088116 B | 11/2012 |
| EP | 0 418 919 A2 | 3/1991 |
| EP | 1 930 922 A2 | 6/2008 |
| JP | 4-12472 A | 1/1992 |
| JP | 5022876 A | 1/1993 |
| JP | 2007-166779 A | 6/2007 |
| JP | 4016045 B2 | 12/2007 |
| SU | 813544 B | 3/1981 |
| TW | 220014 B | 2/1994 |
| TW | 269727 B | 2/1996 |
| TW | 344721 B | 11/1998 |
| TW | 200518370 A | 6/2005 |
| TW | 200527793 A | 8/2005 |
| TW | M275625 U | 9/2005 |
| WO | WO 2010/145439 A1 | 12/2010 |

OTHER PUBLICATIONS

United States Patent and Trademark Office, Notice of Allowance mailed Feb. 11, 2015, in related U.S. Appl. No. 13/187,279.

United States Patent and Trademark Office, Corrected Notice of Allowability mailed Feb. 23. 2015, in related U.S. Appl. No. 13/748,525.

United States Patent and Trademark Office, Office Action mailed Dec. 11, 2014, in related U.S. Appl. No. 13/184,879.

United States Patent and Trademark Office, Office Action mailed Dec. 24, 2014, in related U.S. Appl. No. 13/184,894.

United States Patent and Trademark Office, Office Action mailed Dec. 31, 2014, in related U.S. Appl. No. 13/185,744.

United States Patent and Trademark Office, Office Action mailed Dec. 31, 2014, in related U.S. Appl. No. 13/185,756.

United States Patent and Trademark Office, Office Action mailed Feb. 13, 2015, in related U.S. Appl. No. 13/465,906.

United States Patent and Trademark Office, Office Action mailed Jan. 13, 2015, in related U.S. Appl. No. 13/184,915.

(56) References Cited

OTHER PUBLICATIONS

United States Patent and Trademark Office, Office Action mailed Jun. 10, 2014, in related U.S. Appl. No. 13/168,004.
United States Patent and Trademark Office, Office Action mailed Jun. 18, 2014, in related U.S. Appl. No. 13/168,014.
United States Patent and Trademark Office, Office Action mailed Jun. 16, 2014, in related U.S. Appl. No. 13/184,879.
United States Patent and Trademark Office, Office Action mailed Jun. 20, 2014, in related U.S. Appl. No. 13/184,894.
United States Patent and Trademark Office, Office Action mailed Jun. 25, 2014, in related U.S. Appl. No. 13/187,266.
United States Patent and Trademark Office, Office Action mailed Jun. 24, 2014, in related U.S. Appl. No. 13/184,906.
United States Patent and Trademark Office, Office Action mailed Jun. 17, 2014, in related U.S. Appl. No. 13/185,744.
United States Patent and Trademark Office, Office Action mailed Jun. 16, 2014, in related U.S. Appl. No. 13/184,915.
United States Patent and Trademark Office, Office Action mailed Jun. 24, 2014, in related U.S. Appl. No. 13/187,279.
United States Patent and Trademark Office, Office Action mailed Jun. 13, 2014, in related U.S. Appl. No. 13/185,756.
United States Patent and Trademark Office, Office Action mailed Jul. 7, 2014, in related U.S. Appl. No. 13/187,890.
United States Patent and Trademark Office, Office Action mailed Jun. 25, 2014, in related U.S. Appl. No. 13/541,487.
United States Patent and Trademark Office, Office Action mailed Jun. 26, 2014, in related U.S. Appl. No. 13/748,525.
United States Patent and Trademark Office, Office Action mailed Jun. 24, 2014, in related U.S. Appl. No. 13/749,480.
United States Patent and Trademark Office, Notice of Allowance mailed Apr. 25, 2014, in related U.S. Appl. No. 13/166,281.
United States Patent and Trademark Office, Notice of Allowance mailed Jun. 24, 2014, in related U.S. Appl. No. 13/170,021.
United States Patent and Trademark Office, Notice of Allowance mailed May 2, 2014, in related U.S. Appl. No. 13/166,301.
United States Patent and Trademark Office, Notice of Allowance mailed Jun. 18, 2014, in related U.S. Appl. No. 13/189,096.
United States Patent and Trademark Office, Notice of Allowance mailed May 8, 2014, in related U.S. Appl. No. 13/187,874.
United States Patent and Trademark Office, Notice of Allowance mailed Apr. 28, 2014, in related U.S. Appl. No. 13/189,114.
United States Patent and Trademark Office, Notice of Allowance mailed May 22, 2014, in related U.S. Appl. No. 13/170,044.
China Patent Office, Office Action dated Sep. 21, 2011, in related application CN 201010603658.3.
China Patent Office, Office Action dated Jul. 27, 2011, in related application CN 201010603717.7.
China Patent Office, Office Action dated Jul. 27, 2011, in related application CN 201010604714.5.
China Patent Office, Office Action dated Sep. 5, 2011, in related application CN 201010606082.6.
China Patent Office, Office Action dated Sep. 21, 2011, in related application CN 201010605772.X.
China Patent Office, Office Action dated Feb. 2, 2012, in related application CN 201010604777.0.
China Patent Office, Office Action dated Sep. 2, 2011, in related application CN 201010604777.0.
China Patent Office, Office Action dated Jan. 9, 2012, in related application CN 201010604729.1.
China Patent Office, Office Action dated Jul. 18, 2011, in related application CN 201010604729.1.
China Patent Office, Office Action dated Dec. 28, 2011, in related application CN 201010603719.6.
China Patent Office, Office Action dated Jul. 28, 2011, in related application CN 201010603719.6.
China Patent Office, Office Action dated Jan. 5, 2012, in related application CN 201010603471.3.
China Patent Office, Office Action dated Jul. 15, 2011, in related application CN 201010603471.3.
China Patent Office, Office Action dated Jul. 27, 2011, in related application CN 201010603414.5.
China Patent Office, Office Action dated Nov. 16, 2011, in related application CN 201010603414.5.
China Patent Office, Office Action dated Aug. 1, 2011, in related application CN 201010603669.1.
China Patent Office, Office Action dated Sep. 15, 2011, in related application CN 201010604677.8.
China Patent Office, Office Action dated Feb. 2, 2012, in related application CN 201010604744.6.
China Patent Office, Office Action dated Sep. 20, 2011, in related application CN 201010604744.6.
China Patent Office, Office Action dated Oct. 25, 2011, in related application CN 201110080853.7.
China Patent Office, Office Action dated Nov. 1, 2011, in related application CN 201110081219.5.
China Patent Office, Office Action dated Jan. 21, 2012, in related application CN 201110081276.3.
China Patent Office, Office Action dated Jun. 5, 2012, in related application CN 201110081276.3.
China Patent Office, Office Action dated May 16, 2012, in related application CN 201110137264.8.
China Patent Office, Office Action dated Jan. 21, 2012, in related application CN 201110132362.2.
China Patent Office, Office Action dated Jan. 21, 2012, in related application CN 201110134005.X.
China Patent Office, Office Action dated May 2, 2012, in related application CN 201110134005.X.
European Patent Office, Extended European Search Report dated Sep. 13, 2011, in related application EP 11166955.2.
European Patent Office, Extended European Search Report dated Nov. 30, 2011, in related application EP 11166938.8.
European Patent Office, Extended European Search Report dated Dec. 15, 2011, in related application EP 11166941.2.
European Patent Office, Extended European Search Report dated Sep. 16, 2011, in related application EP 11166949.5.
European Patent Office, Extended European Search Report dated Oct. 6, 2011, in related application EP 11166925.5.
European Patent Office, European Search Report dated Sep. 29, 2011, in related application EP 11166958.6.
European Patent Office, Extended European Search Report dated Jan. 25, 2012, in related application EP 11166952.9.
European Patent Office, European Search Report dated Sep. 21, 2011, in related application EP 11166969.3.
European Patent Office, European Search Report dated Sep. 1, 2011, in related application EP 11166903.2.
European Patent Office, Extended European Search Report dated Nov. 8, 2011, in related application EP 11166872.9.
European Patent Office, Extended European Search Report dated Nov. 25, 2011, in related application EP 11166882.8.
European Patent Office, Extended European Search Report dated Nov. 25, 2011, in related application EP 11166897.6.
European Patent Office, Extended European Search Report dated Sep. 6, 2011, in related application EP 11166900.8.
European Patent Office, Extended European Search Report dated Sep. 23, 2011, in related application EP 11166914.9.
European Patent Office, Extended European Search Report dated Nov. 8, 2011, in related application EP 11166920.6.
European Patent Office, Extended European Search Report dated Sep. 27, 2011, in related application EP 11167066.7.
European Patent Office, Extended European Search Report dated Sep. 8, 2011, in related application EP 11166902.4.
European Patent Office, Extended European Search Report dated Oct. 6, 2011, in related application EP 11167128.5.
Patent Cooperation Treaty, International Search Report and Written Opinion, dated Sep. 1, 2011, in related application PCT/CN2011/074449.
Patent Cooperation Treaty, International Search Report and Written Opinion, dated Aug. 18, 2011, in related application PCT/CN2011/074453.
Patent Cooperation Treaty, International Search Report and Written Opinion, dated Aug. 11, 2011, in related application PCT/CN2011/074463.

(56) References Cited

OTHER PUBLICATIONS

Patent Cooperation Treaty, International Search Report and Written Opinion, dated Aug. 25, 2011, in related application PCT/CN2011/074458.
Patent Cooperation Treaty, International Search Report and Written Opinion, dated Aug. 11, 2011, in related application PCT/CN2011/074462.
Patent Cooperation Treaty, International Search Report and Written Opinion, dated Aug. 11, 2011, in related application PCT/CN2011/074457.
Patent Cooperation Treaty, International Search Report and Written Opinion, dated Aug. 25, 2011, in related application PCT/CN2011/074459.
Patent Cooperation Treaty, International Search Report and Written Opinion, dated Aug. 18, 2011, in related application PCT/CN2011/074456.
Patent Cooperation Treaty, International Search Report and Written Opinion, dated Aug. 18, 2011, in related application PCT/CN2011/074460.
Patent Cooperation Treaty, International Search Report and Written Opinion, dated Aug. 11, 2011, in related application PCT/CN2011/074433.
Patent Cooperation Treaty, International Search Report and Written Opinion, dated Aug. 18, 2011, in related application PCT/CN2011/074436.
Patent Cooperation Treaty, International Search Report and Written Opinion, dated Aug. 25, 2011, in related application PCT/CN2011/074438.
Patent Cooperation Treaty, International Search Report and Written Opinion, dated Aug. 11, 2011, in related application PCT/CN2011/074440.
Patent Cooperation Treaty, International Search Report and Written Opinion, dated Aug. 25, 2011, in related application PCT/CN2011/074455.
Patent Cooperation Treaty, International Search Report and Written Opinion, dated Aug. 11, 2011, in related application PCT/CN2011/074461.
Patent Cooperation Treaty, International Search Report and Written Opinion, dated Sep. 1, 2011, in related application PCT/CN2011/074531.
Patent Cooperation Treaty, International Search Report and Written Opinion, dated Aug. 18, 2011, in related application PCT/CN2011/074442.
Patent Cooperation Treaty, International Search Report and Written Opinion, dated Jul. 21, 2011, in related application PCT/CN2011/074536.
United States Patent and Trademark Office, Office Action mailed Jul. 16, 2013, in related U.S. Appl. No. 13/166,281.
United States Patent and Trademark Office, Office Action mailed May 31, 2013, in related U.S. Appl. No. 13/168,004.
United States Patent and Trademark Office, Office Action mailed May 22, 2013, in related U.S. Appl. No. 13/168,014.
United States Patent and Trademark Office, Office Action mailed Jul. 5, 2013, in related U.S. Appl. No. 13/170,021.
United States Patent and Trademark Office, Office Action mailed Jul. 30, 2013, in related U.S. Appl. No. 13/166,301.
United States Patent and Trademark Office, Office Action mailed Sep. 5, 2013, in related U.S. Appl. No. 13/189,096.
United States Patent and Trademark Office, Office Action mailed Aug. 29, 2013, in related U.S. Appl. No. 13/187,874.
United States Patent and Trademark Office, Office Action mailed Aug. 29, 2013, in related U.S. Appl. No. 13/189,114.
United States Patent and Trademark Office, Office Action mailed Sep. 30, 2013, in related U.S. Appl. No. 13/170,044.
United States Patent and Trademark Office, Office Action mailed Jun. 19, 2013, in related U.S. Appl. No. 13/187,890.
United States Patent and Trademark Office, Office Action mailed Sep. 26, 2014, in related U.S. Appl. No. 13/544,881.
United States Patent and Trademark Office, Office Action mailed Sep. 3, 2014, in related U.S. Appl. No. 13/486,883.
United States Patent and Trademark Office, Office Action mailed Sep. 11, 2014, in related U.S. Appl. No. 13/465,906.
United States Patent and Trademark Office, Office Action mailed Sep. 11, 2014, in related U.S. Appl. No. 13/545,885.
United States Patent and Trademark Office, Notice of Allowance mailed Oct. 6, 2014, in related U.S. Appl. No. 13/168,014.
United States Patent and Trademark Office, Notice of Allowance mailed Oct. 6, 2014, in related U.S. Appl. No. 13/184,906.
United States Patent and Trademark Office, Notice of Allowance mailed Oct. 6, 2014, in U.S. Appl. No. 13/187,279.
United States Patent and Trademark Office, Notice of Allowance mailed Oct. 3, 2014, in related U.S. Appl. No. 13/187,890.
United States Patent and Trademark Office, Notice of Allowance mailed Oct. 7, 2014, in related U.S. Appl. No. 13/541,487.
United States Patent and Trademark Office, Notice of Allowance mailed Oct. 6, 2014, in related U.S. Appl. No. 13/748,525.
United States Patent and Trademark Office, Notice of Allowance mailed Oct. 6, 2014, in related U.S. Appl. No. 13/749,480.
United States Patent and Trademark Office, Office Action mailed Nov. 13, 2014, in related U.S. Appl. No. 13/168,004.
United States Patent and Trademark Office, Office Action mailed Nov. 17, 2014, in related U.S. Appl. No. 13/187,266.
Taiwan Intellectual Property Office, Office Action dated Jan. 10, 2014, in related application TW 100143128.
Taiwan Intellectual Property Office, Office Action dated Jan. 10, 2014, in related application TW 100143130.
Taiwan Intellectual Property Office, Office Action dated Jan. 10, 2014, in related application TW 100143133.
Taiwan Intellectual Property Office, Office Action dated Jan. 7, 2014, in related application TW 100140587.
Taiwan Intellectual Property Office, Office Action dated Jan. 6, 2014, in related application TW 100140588.
Taiwan Intellectual Property Office, Office Action dated Feb. 17, 2014, in related application TW 100143160.
Taiwan Intellectual Property Office, Office Action dated Jan. 6, 2014, in related application TW 100140590.
Taiwan Intellectual Property Office, Office Action dated Jan. 17, 2014, in related application TW 100141797.
Taiwan Intellectual Property Office, Office Action dated Jan. 17, 2014, in related application TW 100141802.
United States Patent and Trademark Office, Notice of Allowance mailed Dec. 5, 2013, in related U.S. Appl. No. 13/166,281.
United States Patent and Trademark Office, Notice of Allowance mailed Nov. 8, 2013, in related U.S. Appl. No. 13/166,301.
United States Patent and Trademark Office, Notice of Allowance mailed Jan. 6, 2014, in related U.S. Appl. No. 13/189,096.
United States Patent and Trademark Office, Notice of Allowance mailed Jan. 6, 2014, in related U.S. Appl. No. 13/187,874.
United States Patent and Trademark Office, Office Action mailed Nov. 20, 2013, in related U.S. Appl. No. 13/168,004.
United States Patent and Trademark Office, Office Action mailed Nov. 22, 2013, in related U.S. Appl. No. 13/168,014.
United States Patent and Trademark Office, Final Office Action mailed Feb. 25, 2014, in related U.S. Appl. No. 13/170,021.
United States Patent and Trademark Office, Office Action mailed Jan. 6, 2014, in related U.S. Appl. No. 13/187,266.
United States Patent and Trademark Office, Office Action mailed Jan. 3, 2014, in related U.S. Appl. No. 13/184,906.
United States Patent and Trademark Office, Office Action mailed Jan. 2, 2014, in related U.S. Appl. No. 13/189,114.
United States Patent and Trademark Office, Office Action mailed Dec. 3, 2013, in related U.S. Appl. No. 13/187,279.
United States Patent and Trademark Office, Office Action mailed Dec. 4, 2013, in related U.S. Appl. No. 13/187,890.
United States Patent and Trademark Office, Office Action mailed Jan. 6, 2014, in related U.S. Appl. No. 13/541,487.
United States Patent and Trademark Office, Office Action mailed Dec. 4, 2013, in related U.S. Appl. No. 13/748,525.
United States Patent and Trademark Office, Office Action mailed Jan. 15, 2014, in related U.S. Appl. No. 13/749,480.
United States Patent and Trademark Office, Office Action mailed Mar. 25, 2015, in related U.S. Appl. No. 13/187,266.

(56) References Cited

OTHER PUBLICATIONS

United States Atent and Trademark Office, Office Action mailed Apr. 1, 2015, in related U.S. Appl. No. 13/747,387.
United States Patent and Trademark Office, Office Action mailed Apr. 13, 2015, in related U.S. Appl. No. 13/545,885.
United States Patent and Trademark Office, Corrected Notice of Allowability mailed Apr. 3, 2015, in related U.S. Appl. No. 13/168,004.
United States Patent an Trademark Office, Notice of Allowance mailed Mar. 18, 2015, in related U.S. Appl. No. 13/184,879.
United States Patent and Trademark Office, Notice of Allowance mailed Mar. 27, 2015, in related U.S. Appl. No. 13/184,894.
United States Patent and Trademark Office, Notice of Allowance mailed Mar. 23, 2015, in related U.S. Appl. No. 13/185.744.
United States Patent and Trademark. Office, Notice of Allowance mailed Mar. 30, 2015, in related U.S. Appl. No. 13/184,915.
United States Patent and Trademark Office, Notice of Allowance mailed Apr. 29, 2015, in related U.S. Appl. No. 13/185,756.
United States Patent and Trademark Office, Notice of Allowance mailed Mar. 3, 2015, in related U.S. Appl. No. 13/544,881.
United States Patent and Trademark Office, Supplemental Notice of Allowability mailed Mar. 17, 2015, in related U.S. Appl. No. 13/544,881.
United States Patent and Trademark Office, Notice of Allowance mailed Mar. 18, 2015, in related U.S. Appl. No. 13/486,883.
United States Patent and Trademark Office, Corrected Notice of Allowability mailed May 13, 2015, in related U.S. Appl. No. 13/168,004.
United States Patent and Trademark Office, Corrected Notice of Allowability mailed May 20, 2015, in related U.S. Appl. No. 13/184,894.
United States Patent and Trademark Office, Corrected Notice of Allowability mailed May 21, 2015, in related U.S. Appl. No. 13/184,915.
United States Patent and Trademark Office, Supplemental Notice of Allowability mailed May 20, 2015 in related U.S. Appl. No. 13/544.881.
United States Patent and Trademark Office, Notice of Allowance mailed May 20, 2015 in related U.S. Appl. No. 13/465.906.

* cited by examiner

CIRCUITS AND METHODS FOR HEATING BATTERIES IN PARALLEL USING RESONANCE COMPONENTS IN SERIES

1. CROSS-REFERENCE TO RELATED APPLICATIONS

This application is continuation-in-part of U.S. patent application Ser. No. 13/187,874, which claims priority to Chinese Patent Application No. 201010245288.0, filed Jul. 30, 2010, Chinese Patent Application No. 201010274785.3, filed Aug. 30, 2010, Chinese Patent Application No. 201010603669.1, filed Dec. 23, 2010, and Chinese Patent Application No. 201010604677.8, filed Dec. 23, 2010, all these five applications being incorporated by reference herein for all purposes.

Additionally, this application is related to International Application Publication No. WO2010/145439A1 and Chinese Application Publication No. CN102055042A, both these two applications being incorporated by reference herein for all purposes.

2. BACKGROUND OF THE INVENTION

The present invention pertains to electric and electronic field, in particular related to a battery heating circuit.

Considering cars need to run under complex road conditions and environmental conditions or some electronic devices are used under harsh environmental conditions, the battery, which serves as the power supply unit for electric-motor cars or electronic devices, need to be adaptive to these complex conditions. In addition, besides these conditions, the service life and charge/discharge cycle performance of the battery need to be taken into consideration; especially, when electric-motor cars or electronic devices are used in low temperature environments, the battery needs to have outstanding low-temperature charge/discharge performance and higher input/output power performance.

Usually, under low temperature conditions, the resistance of the battery will increase, and so will the polarization; therefore, the capacity of the battery will be reduced.

To keep the capacity of the battery and improve the charge/discharge performance of the battery under low temperature conditions, some embodiments of the present invention provide a battery heating circuit.

3. BRIEF SUMMARY OF THE INVENTION

The objective of certain embodiments of the present invention is to provide a battery heating circuit, in order to solve the problem of decreased capacity of the battery caused by increased resistance and polarization of the battery under low temperature conditions.

Certain embodiments of the present invention provide a battery heating circuit, wherein: the battery comprises a first battery and a second battery; the heating circuit comprises a first switch unit, a second switch unit, a damping component R1, a damping component R2, a current storage component L3, a current storage component L4, a switching control module and an energy storage component V1; the first battery, the damping component R1, the current storage component L3, the energy storage component V1 and the first switch unit are connected in series to constitute a first charging/discharging circuit; the second battery, the damping component R2, the current storage component L4, the energy storage component V1 and the second switch unit are connected in series to constitute a second charging/discharging circuit; when the energy storage component V1 is charged or discharges, the direction of charging/discharging current in the second charging/discharging circuit is opposite to the direction of charging/discharging current in the first charging/discharging circuit; the switching control module is electrically connected with the first switch unit and the second switch unit, and is configured to control the first switch unit and the second switch unit to switch on alternately, so as to control the electric energy to flow between the first battery, the energy storage component V1 and the second battery.

In the heating circuit provided in certain embodiments of the present invention, the first switch unit and the second switch unit can be controlled by the switching control module to switch on alternately, so that the electric energy can flow back-and-forth between the first battery, the energy storage component V1 and the second battery alternately, and thereby causes the damping component R1 and the damping component R2 to generate heat, so as to heat up the first battery and the second battery. For example, since the direction of charging/discharging current in the second charging/discharging circuit is opposite to the direction of charging/discharging current in the first charging/discharging circuit when viewed from the perspective of the energy storage component V1, the energy that is transferred from the first battery into the energy storage component V1 can be transferred successfully to the second battery, so that the heating efficiency is improved.

Other characteristics and advantages of the present invention will be further described in detail in the following section for embodiments.

4. BRIEF DESCRIPTION OF THE DRAWINGS

The accompanying drawings, as a part of this description, are provided here to facilitate further understanding of the present invention, and are used in conjunction with the following embodiments to explain the present invention, but shall not be comprehended as constituting any limitation on the present invention. In the figures.

Figure 9:
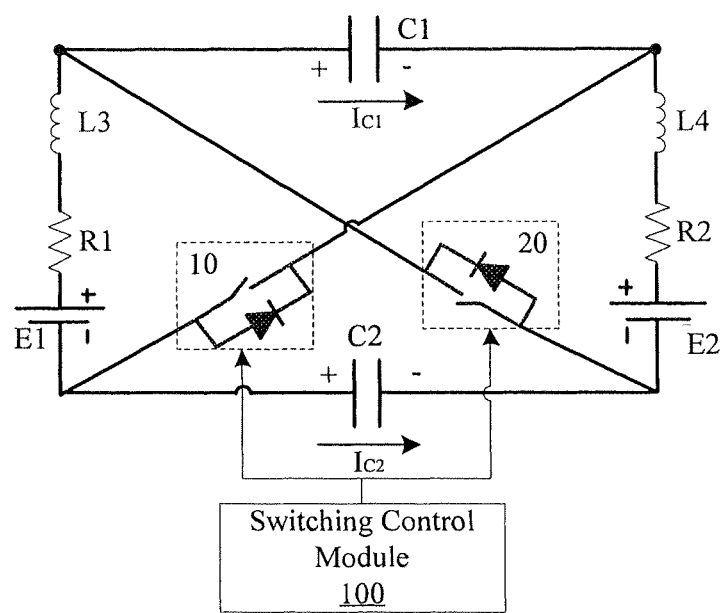
FIG. 9 is a schematic diagram showing a battery heating circuit according to yet another embodiment of the present invention.
Figure 10:
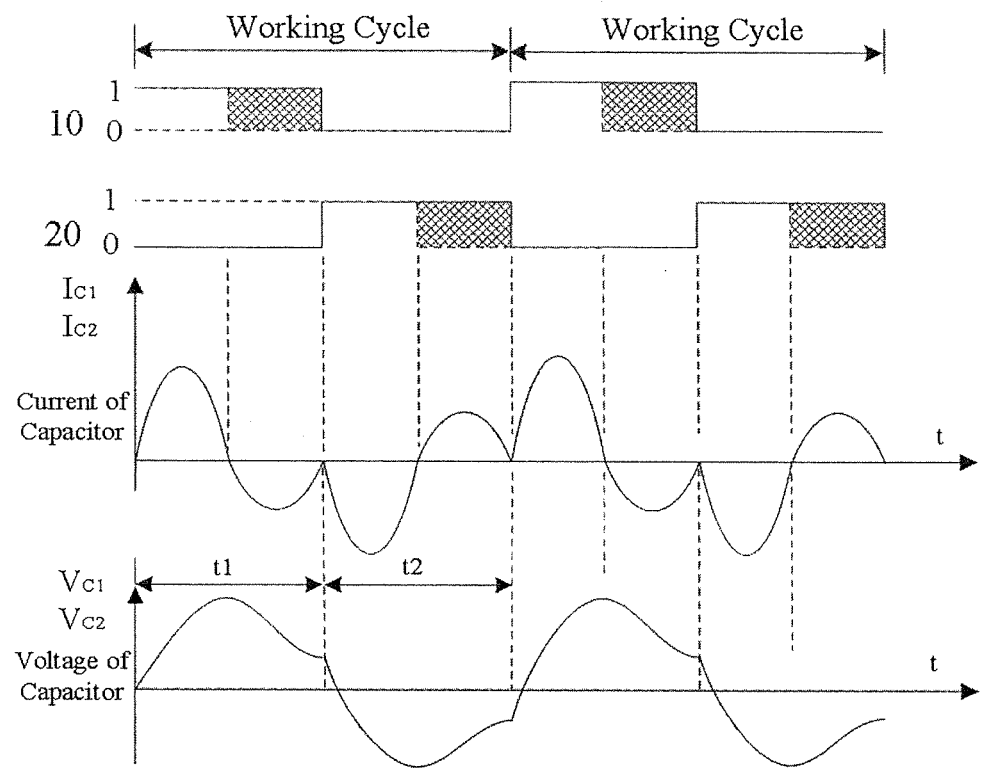
Figure 11:
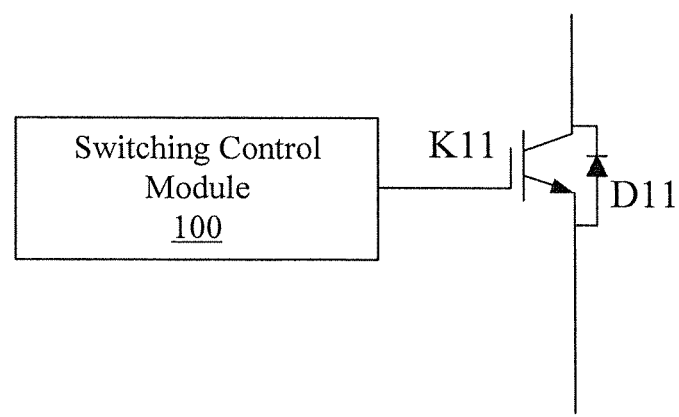

FIG. 10 is a timing diagram of waveforms of the heating circuit as shown in FIG. 9 according to yet another embodiment of the present invention; and FIG. 11 is a schematic diagram showing the first switch unit and/or the second switch unit as part of the battery heating circuit as shown in FIG. 1, FIG. 2, FIG. 4, FIG. 6, FIG. 7, and/or FIG. 9 according to certain embodiments of the present invention.

5. DETAILED DESCRIPTION OF THE INVENTION

Certain embodiments of the present invention are described in detail below, with reference to the accompanying drawings. It should be appreciated that the embodiments described here are only provided to describe and explain the present invention, but shall not be deemed as constituting any limitation on the present invention.

It is noted that, unless otherwise specified, when mentioned hereafter in this description, the term "switching control module" may refer to any controller that can output control commands (e.g., pulse waveforms) under preset conditions or at preset times and thereby control the switch unit connected to it to switch on or switch off accordingly, according to some embodiments. For example, the switching control module can be a PLC. Unless otherwise specified, when mentioned hereafter in this description, the term "switch" may refer to a switch that enables ON/OFF control by using electrical signals or enables ON/OFF control on the basis of the characteristics of the component according to certain embodiments. For example, the switch can be either a one-way switch (e.g., a switch composed of a two-way switch and a diode connected in series, which can be conductive in one direction) or a two-way switch (e.g., a Metal Oxide Semiconductor Field Effect Transistor (MOSFET) or an IGBT with an anti-parallel freewheeling diode). Unless otherwise specified, when mentioned hereafter in this description, the term "two-way switch" may refer to a switch that can be conductive in two directions, which can enable ON/OFF control by using electrical signals or enable ON/OFF control on the basis of the characteristics of the component according to some embodiments. For example, the two-way switch can be a MOSFET or an IGBT with an anti-parallel freewheeling diode. Unless otherwise specified, when mentioned hereafter in this description, the term "one-way semiconductor component" may refer to a semiconductor component that can be conductive in one direction, such as a diode, according to certain embodiments. Unless otherwise specified, when mentioned hereafter in this description, the term "charge storage component" may refer to any device that can enable charge storage, such as a capacitor, according to some embodiments. Unless otherwise specified, when mentioned hereafter in this description, the term "current storage component" may refer to any device that can store current, such as an inductor, according to certain embodiments. Unless otherwise specified, when mentioned hereafter in this description, the term "forward direction" may refer to the direction in which the energy flows from the battery to the energy storage circuit, and the term "reverse direction" may refer to the direction in which the energy flows from the energy storage circuit to the battery, according to some embodiments. Unless otherwise specified, when mentioned hereafter in this description, the term "battery" may comprise primary battery (e.g., dry battery or alkaline battery, etc.) and secondary battery (e.g., lithium-ion battery, nickel-cadmium battery, nickel-hydrogen battery, or lead-acid battery, etc.), according to certain embodiments. Unless otherwise specified, when mentioned hereafter in this description, the term "damping component" may refer to any device that inhibits current flow and thereby enables energy consumption, such as a resistor, etc., according to some embodiments. Unless otherwise specified, when mentioned hereafter in this description, the term "main loop" may refer to a loop composed of battery, damping component, switch unit and energy storage circuit connected in series according to certain embodiments.

It should be noted specially that, considering different types of batteries have different characteristics, in some embodiments of the present invention, "battery" may refer to an ideal battery that does not have internal parasitic resistance and parasitic inductance or has very low internal parasitic resistance and parasitic inductance, or may refer to a battery pack that has internal parasitic resistance and parasitic inductance; therefore, those skilled in the art should appreciate that if the battery is an ideal battery that does not have internal parasitic resistance and parasitic inductance or has very low internal parasitic resistance and parasitic inductance, the damping component R1 may refer to a damping component external to the battery and the current storage component L1 may refer to a current storage component external to the battery; if the battery is a battery pack that has internal parasitic resistance and parasitic inductance, the damping component R1 may refer to a damping component external to the battery or refer to the parasitic resistance in the battery pack, and the current storage component L1 may refer to a current storage component external to the battery or refer to the parasitic inductance in the battery pack, according to certain embodiments.

To ensure the normal service life of the battery, according to some embodiments, the battery can be heated under low temperature condition, which is to say, when the heating condition is met, the heating circuit is controlled to start heating for the battery; when the heating stop condition is met, the heating circuit is controlled to stop heating, according to certain embodiments.

In the actual application of battery, the battery heating condition and heating stop condition can be set according to the actual ambient conditions, to ensure normal charge/discharge performance of the battery, according to some embodiments.

Figure 1:
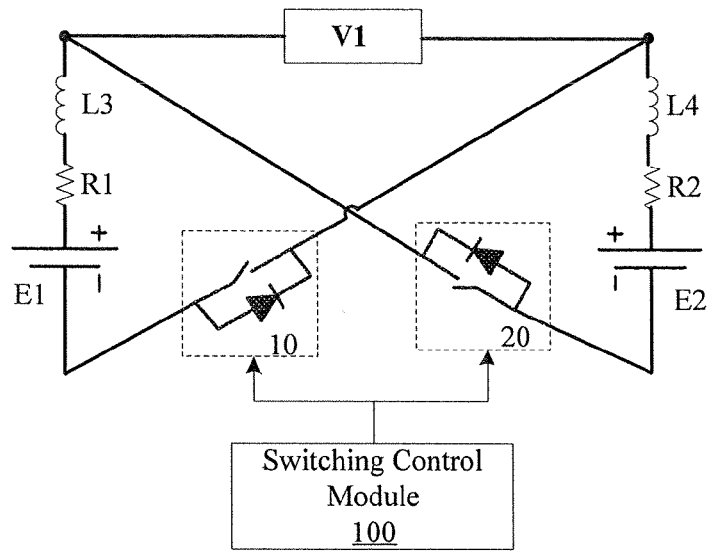
FIG. 1 is a schematic diagram showing a battery heating circuit according to one embodiment of the present invention.

FIG. 1 is a schematic diagram of the heating circuit in the first embodiment of the present invention. As shown in FIG. 1, one embodiment of the present invention provides a battery heating circuit, wherein: the battery comprises a first battery E1 and a second battery E2; the heating circuit comprises a first switch unit 10, a second switch unit 20, a damping component R1, a damping component R2, a current stage component L3, a current stage component L4, a switching control module 100 and an energy storage component V1; the first battery E1, damping component R1, current stage component L3, energy storage component V1 and first switch unit 10 are connected in series to constitute a first charging/discharging circuit; the second battery E2, damping component R2, current stage component L4, energy storage component V1 and second switch unit 20 are connected in series to constitute a second charging/discharging circuit; when the energy storage component V1 is charged or discharges, the direction of charging/discharging current in the second charging/discharging circuit is reverse to the direction of charging/discharging current in the first charging/discharging circuit; the switching control module 100 is electrically connected with the first switch unit 10 and second switch unit 20, and is configured to control the first switch unit 10 and second switch unit 20 to switch on in alternate, so as to control the electric energy to flow among the first battery E1, energy storage component V1 and second battery E2.

wherein: the damping component R1 and the damping component R2 can be the parasitic resistances in the first battery E1 and the second battery E2 respectively, and the current storage component L3 and the current storage component L4 can be the parasitic inductances in the first battery E1 and the second battery E2 respectively.

Figure 2:
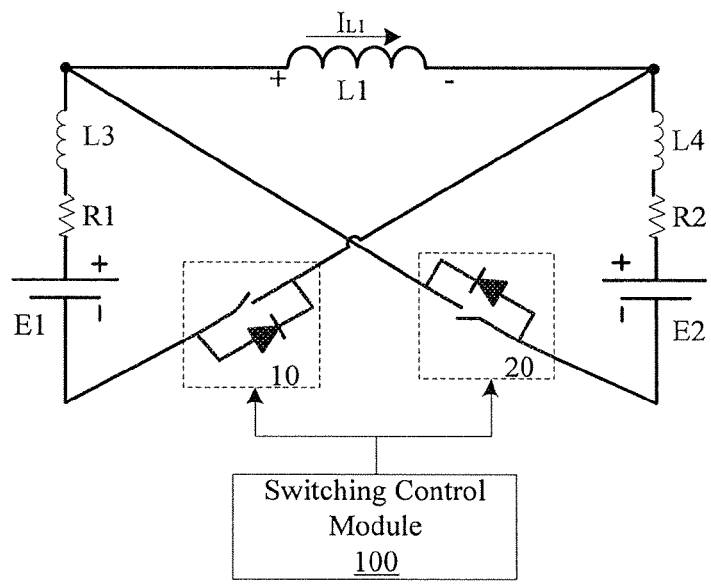
FIG. 2 is a schematic diagram showing a battery heating circuit according to another embodiment of the present invention.
Figure 3:
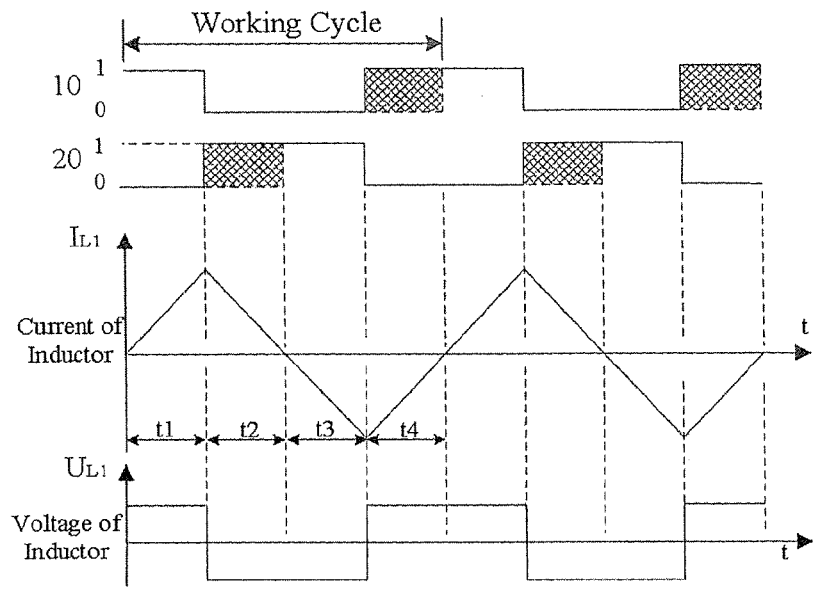
FIG. 3 is a timing diagram of waveforms of the heating circuit as shown in FIG. 2 according to another embodiment of the present invention.
Figure 4:
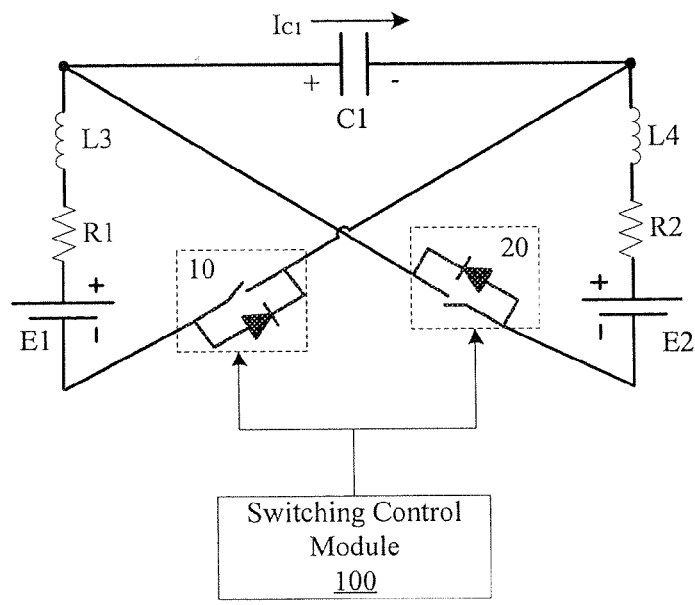
FIG. 4 is a schematic diagram showing a battery heating circuit according to yet another embodiment of the present invention.
Figure 5:
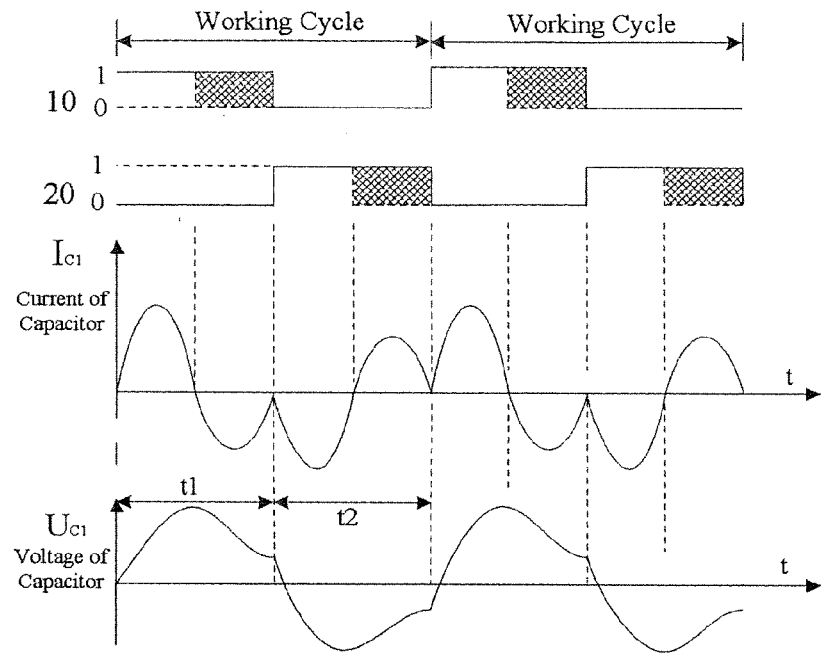
FIG. 5 is a timing diagram of waveforms of the heating circuit as shown in FIG. 4 according to yet another embodiment of the present invention.

Wherein: the energy storage component V1 can be an inductor L1 or a capacitor C1. FIG. 2 and FIG. 4 show the circuit diagrams in the case that the energy storage component V1 is an inductor L1 or capacitor C1, respectively according to certain embodiments; FIG. 3 and FIG. 5 show the timing sequence diagrams of waveform corresponding to FIG. 2 and FIG. 4, respectively according to some embodiments. Hereunder the heating circuit in the first embodiment of the present invention will be described, with reference to FIG. 2 to FIG. 5 as examples.

As shown in FIG. 2, the energy storage component V1 can be an inductor L1, the switching control module 100 can control the first switch unit 10 and second switch unit 20 to switch theirs ON/OFF states when the current in the inductor L1 reaches a preset value, for example, the first switch unit 10 switches from ON state to OFF state, while the second switch unit 20 switches from OFF state to ON state, so that the electric energy stored in the inductor L1 from one battery can flow into the other battery. As the electric energy flows, current is generated; by keeping current flowing through the damping component R1 and damping component R2 continuously, the damping component R1 and damping component R2 generate heat, and thereby heat up the first battery E1 and second battery E2.

FIG. 3 is a timing sequence diagram of the waveform of the circuit as shown in FIG. 2 according to one embodiment. Hereunder the working process of the heating circuit provided in one embodiment of the present invention will be described, with reference to FIG. 3 as an example. First, the switching control module 100 controls the first switch unit 10 to switch on, and controls the second switch unit 20 to switch off; thus, the first battery E1 charges the inductor L1, and therefore the current in the inductor L1 increases gradually (as indicated by the time period t1 as shown in FIG. 3). When the current $I_{L1}$ in the inductor L1 rises to a preset value, the switching control module 100 controls the first switch unit 10 to switch off and controls the second switch unit 20 to switch on; the inductor L1 transfers the energy stored in it to the second battery E2, and therefore the current in the inductor L1 decreases slowly (as indicated by the time period t2). Then, after the energy stored in the inductor L1 is released, the second battery E2 starts charging the inductor L1, and therefore the current $I_{L1}$ in the inductor L1 increases slowly. At this time, the flow direction of the current $I_{L1}$ in the inductor L1 is opposite to the flow direction during the time periods t1 and t2 (as indicated by the time period t3). Then, when the current $I_{L1}$ in the inductor L1 rises to a preset value, the switching control module 100 controls the first switch unit 10 to switch on and controls the second switch unit 20 to switch off; the inductor L1 transfers the energy stored in it to the first battery E1, and therefore the current $I_{L1}$ in the inductor L1 decreases slowly (as indicated by the time period t4; now, the heating circuit has completed a working cycle). In that way, the cycles continue on, so that the current flows through the damping component R1 and the damping component R2 continuously; as a result, the damping component R1 and the damping component R2 generate heat, and thereby heat up the first battery E1 and the second battery E2 until the heating process is completed. It should be noted: $U_{L1}$ in FIG. 3 represents the voltage of the inductor L1, which is a constant value in forward direction when the current $I_{L1}$ through the inductor L1 increases in forward direction or decreases in reverse direction, and is another constant value in reverse direction when the current $I_{L1}$ through the inductor L1 decreases in forward direction or increases in reverse direction.

In the above working process of the heating circuit provided in one embodiment of the present invention, the current can be kept flowing back-and-forth between the first battery E1 and the second battery E2, so that the two batteries are heated up alternately, and therefore the heating efficiency is improved. In addition, due to the existence of the inductor L1, the current flowing through the first battery, the second battery, the first switch unit, and the second switch unit is limited; alternatively, the current flowing through the first battery, the second battery, the first switch unit, and the second switch unit can be limited by using a preset value, so as to reduce the current flowing through the first battery, the second battery, the first switch unit, and the second switch unit, to achieve the purpose of protecting the first battery, the second battery, the first switch unit, and the second switch unit, according to another embodiment.

As shown in FIG. 4, the energy storage component V1 is a capacitor C1, the switching control module 100 can control the first switch unit 10 and second switch unit 20 to switch their ON/OFF states when the current in the capacitor C1 reaches zero after each pair of continuous positive and negative half cycles or each pair of continuous negative and positive half cycles, for example, the first switch unit 10 can switch from ON state to OFF state, while the second switch unit 20 can switch from OFF state to ON state, so that the electric energy stored in the capacitor C1 from one battery can flow into the other battery. As the electric energy flows, current is generated; by keeping current flowing through the damping component R1 and damping component R2 continuously, the damping component R1 and damping component R2 generate heat, and thereby heat up the first battery E1 and second battery E2.

FIG. 5 is a timing sequence diagram of the waveform of the circuit as shown in FIG. 4 according to one embodiment. Hereunder the working process of the heating circuit provided in one embodiment of the present invention will be described, with reference to FIG. 5 as an example. First, the switching control module 100 controls the first switch unit 10 to switch on, and controls the second switch unit 20 to switch off; the first battery E1, the damping component R1, the current storage component L3, the capacitor C1 and the first switch unit 10 form a charging/discharging circuit, which performs charging/discharging operations (as indicated by the time period t1 in FIG. 5). After the charging/discharging circuit completes a charging/discharging cycle (at this point, the current $I_{C1}$ through the capacitor C1 reaches zero after the negative half cycle, the voltage $U_{C1}$ of the capacitor C1 has passed the peak value in the positive half cycle), the switching control module 100 controls the first switch unit 10 to switch off and controls the second switch unit 20 to switch on; thus, the second battery E2, the damping component R2, the current storage component L4, the capacitor C1 and the second switch unit 20 form a charging/discharging circuit, which performs charging/discharging operations (as indicated by the time period t2 in FIG. 5). After the charging/discharging circuit completes a charging/discharging cycle (at this point, the current $I_{C1}$ through capacitor C1 reaches zero after the positive half cycle, and the entire heating circuit has completed a working cycle), the switching control module 100 controls the first switch unit 10 to switch on and controls the switch unit 20 to switch off again; in that way, the cycles continue on, so that the current flows through the damping component R1 and the damping component R2 continuously; as a result, the damping component R1 and the damping component R2 generate heat, and thereby heat up the first battery E1 and the second battery E2 until the heating process is completed.

In the above working process of the heating circuit as shown in FIG. 4, the current can be kept flowing back-and-forth between the first battery E1 and the second battery E2, so that the two batteries are heated up alternately, and therefore the heating efficiency is improved according to one embodiment. In addition, in the heating circuit as shown in FIG. 4, the capacitor is connected in series with the batteries according to another embodiment. For example, when the batteries are heated, safety problems related with failure or short circuit of the switch units can be avoided due to the existence of the capacitor connected in series, and therefore the batteries can be protected effectively.

Figure 6:
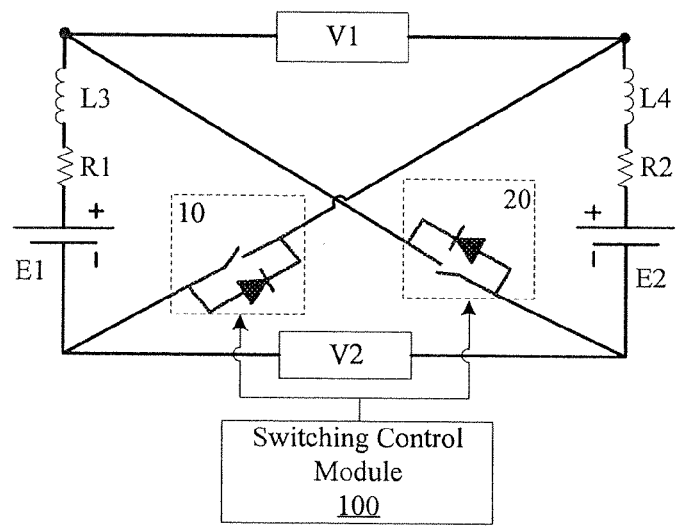
FIG. 6 is a schematic diagram showing a battery heating circuit according to yet another embodiment of the present invention.

FIG. 6 is a schematic diagram of the heating circuit in the second embodiment of the present invention. Preferably, as shown in FIG. 6, the heating circuit provided in one embodiment of the present invention can further comprise an energy storage component V2; the first battery E1, damping component R1, current stage component L3, energy storage component V2 and second switch unit 20 are connected in series to form a third charging/discharging circuit; the second battery E2, damping component R2, current stage component L4, energy storage component V2 and first switch unit 10 are connected in series to form a fourth charging/discharging circuit; when the energy storage component V2 is charged or discharges, the direction of charging/discharging current in the third charging/discharging circuit is reverse to the direction of charging/discharging current in the fourth charging/discharging circuit; the switching control module 100 also controls the electric energy to flow among the first battery E1, energy storage component V1, energy storage component V2 and second battery E2 by controlling the first switch unit 10 and second switch unit 20 to switch on in alternate.

Figure 7:
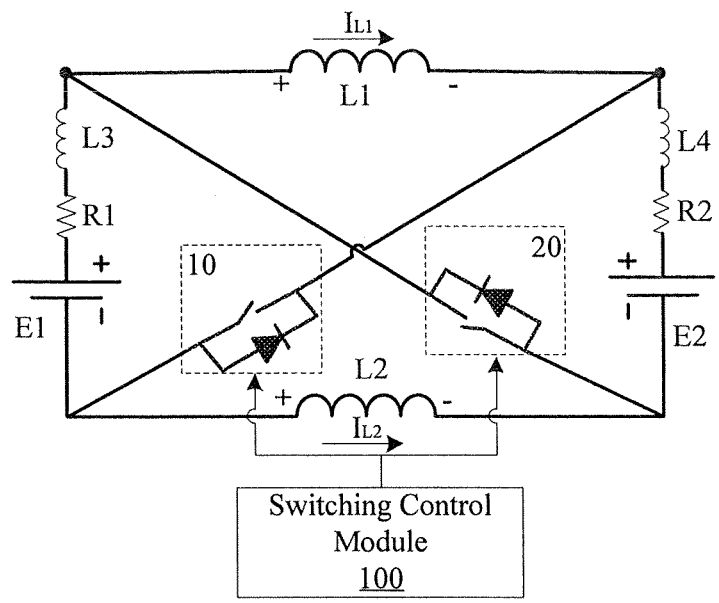
FIG. 7 is a schematic diagram showing a battery heating circuit according to yet another embodiment of the present invention.
Figure 8:
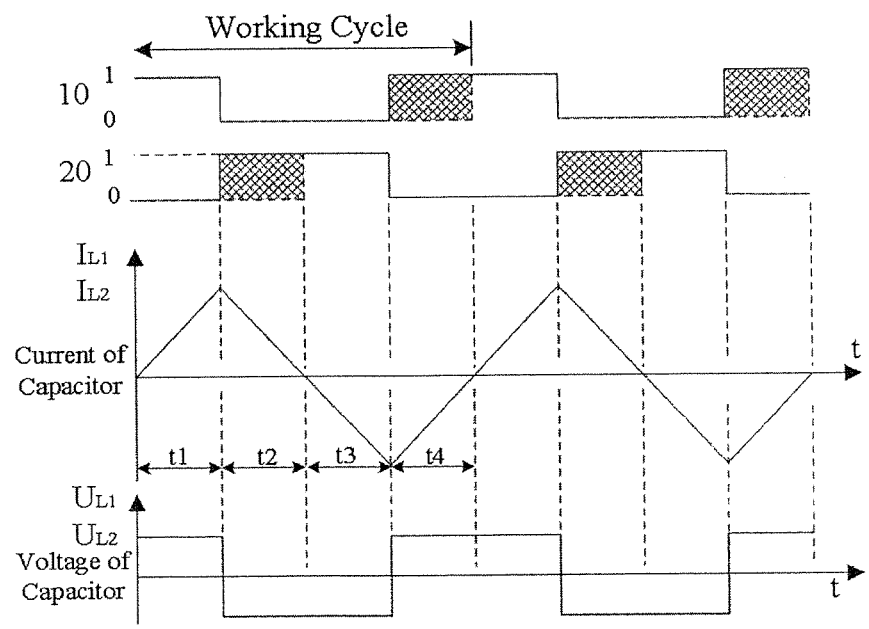
FIG. 8 is a timing diagram of waveforms of the heating circuit as shown in FIG. 7 according to yet another embodiment of the present invention.

Wherein: the energy storage component V2 can also be an inductor L2 or a capacitor C2. FIG. 7 and FIG. 9 show the circuit diagrams in the case that the energy storage component V2 is an inductor L2 or capacitor C2, respectively according to certain embodiments; FIG. 8 and FIG. 10 show the timing sequence diagrams of waveform corresponding to FIG. 7 and FIG. 9, respectively according to some embodiments. Hereunder the heating circuit in the second embodiment of the present invention will be described, with reference to FIG. 7 to FIG. 10 as examples.

As shown in FIG. 7, the energy storage component V1 is an inductor L1, the energy storage component V2 is an inductor L2, the switching control module can control the first switch unit 10 and second switch unit 20 to switch their ON/OFF states when the current in the inductor L1 or inductor L2 reaches a preset value. FIG. 8 is a timing sequence diagram of the waveform of the circuit as shown in FIG. 7 according to one embodiment. Hereunder the working process of the heating circuit provided in the second embodiment of the present invention will be described, with reference to FIG. 8 as an example.

First, the switching control module 100 controls the first switch unit 10 to switch on, and controls the second switch unit 20 to switch off; thus, the first battery E1 charges the inductor L1, and the second battery E2 charges the inductor L2; as a result, the current $I_{L1}$ and the current $I_{L2}$ in the inductor L1 and the inductor L2 increase slowly (as indicated by the time period t1 as shown in FIG. 8). When the current $I_{L1}$ in the inductor L1 or the current $I_{L2}$ in the inductor L2 rises to a preset value, the switching control module 100 controls the first switch unit 10 to switch off and controls the second switch unit 20 to switch on; the inductor L1 transfers the energy stored in it to the second battery E2, and the inductor L2 transfers the energy stored in it to the first battery E1; therefore the current $I_{L1}$ in the inductor L1 and the current $I_{L2}$ in the inductor L2 decrease slowly (as indicated by the time period t2). Then, after the energy stored in the inductor L1 and L2 is released, the second battery E2 starts to charge the inductor L1, and the first battery E1 starts to charge the inductor L2; therefore the current $I_{L1}$ in the inductor L1 and the current $I_{L2}$ in the inductor L2 increase slowly. At this time, the flow direction of the current in the inductor L1 and the inductor L2 is opposite to the flow direction in the time periods $t_1$ and $t_2$ (as indicated by the time period t3). Then, when the current $I_{L1}$ in the inductor L1 or the current $I_{L2}$ in the inductor L2 rises to a preset value, the switching control module 100 controls the first switch unit 10 to switch on and controls the second switch unit 20 to switch off; the inductor L1 transfers the energy stored in it to the first battery E1, and the inductor L2 transfers the energy stored in it to the second battery E2; therefore the current $I_{L1}$ in the inductor L1 and the current $I_{L2}$ in the inductor L2 decrease slowly (as indicated by the time period t4; now, the heating circuit has completed a working cycle). The cycles continue on, till the first battery E1 and the second battery E2 are heated up until the heating process is completed. It should be noted: $U_{L1}$ and $U_{L2}$ in FIG. 8 represent the voltage of the inductor L1 and the voltage of the inductor L2; the voltage $U_{L1}$ is a constant value in forward direction when the current $I_{L1}$ through the inductor L1 increases in forward direction or decreases in reverse direction, and is another constant value in reverse direction when the current $I_{L1}$ through the inductor L1 decreases in forward direction or increases in reverse direction. The same is true also for voltage $U_{L2}$.

By adding an inductor L2 in the heating circuit, the first battery E1 and the second battery E2 are always in a charging/discharging process, and the current always flows through the impedance component R1 and the impedance component R2; thus, the heating efficiency is further improved according to one embodiment. Alternatively, the current flowing through the first battery, the second battery, the first switch unit, and the second switch unit can be limited by the inductor L1 and the inductor L2, as well as by the preset value, so that the first battery, the second battery, the first switch unit, and the second switch unit are protected according to another embodiment.

In addition, it should be noted: the "preset value" mentioned above shall be set according to the current tolerable by the first battery E1, the second battery E2, and other components in the heating circuit, with comprehensive consideration of heating efficiency and protection of the first battery E1 and the second battery E2 against damage, as well as the size, weight and cost of the heating circuit, according to certain embodiments.

As shown in FIG. 9, the energy storage component V1 is a capacitor C1, the energy storage component V2 is a capacitor C2, the switching control module 100 can control the first switch unit 10 and second switch unit 20 to switch their ON/OFF states when the current in the capacitor C1 or capacitor C2 reaches zero after each pair of continuous positive and negative half cycles or each pair of continuous negative and positive half cycles. FIG. 10 is a timing sequence diagram of the waveform of the circuit as shown in FIG. 9 according to one embodiment. Hereunder the working process of another heating circuit in the second embodiment of the present invention will be described, with reference to FIG. 9 and FIG. 10 as examples.

First, the switching control module 100 controls the first switch unit 10 to switch on, and controls the second switch unit 20 to switch off; the first battery E1, the damping component R1, the current stage component L3, the capacitor C1 and the first switch unit 10 form a charging/discharging circuit; the second battery E2, the damping component R2, the current stage component L4, the capacitor C2 and the first switch unit 10 form another charging/discharging circuit; the two charging/discharging circuits perform charging/discharging operations (as indicated by the time period t1 as shown in FIG. 10; please note: the voltage waveform and the current waveform of capacitor C1 are the same as those of the capacitor C2). After the two charging/discharging circuits complete a charging/discharging cycle (at this point, the current $I_{C1}$ through the capacitor C1 or the current $I_{C2}$ through the capacitor C2 reaches zero after the negative half cycle, the voltage $U_{C1}$ of the capacitor C1 or the voltage $U_{C2}$ of the capacitor C2 has passed the peak value in the positive half cycle), the switching control module 100 controls the first switch unit 10 to switch off and controls the second switch unit 20 to switch on; thus, the first battery E1, the damping component R1, the current stage component L3, the capacitor C2 and the second switch unit 20 form a charging/discharging circuit, and the second battery E2, the damping component R2, the current stage component L4, the capacitor C1 and the second switch unit 20 form another charging/discharging circuit; the two charging/discharging circuits perform charging/discharging operations (as indicated by the time period t2 as shown in FIG. 10; please note: at this point, the voltage waveform and the current waveform of the capacitor C1 are the same as those of the capacitor C2). After the two charging/discharging circuits complete a charging/discharging cycle (at this point, the current $I_{C1}$ through the capacitor C1 or the current $I_{C2}$ through the capacitor C2 reaches zero after the positive half cycle, and the entire heating circuit has completed a working cycle), the switching control module 100 controls the first switch unit 10 to switch on and controls the second switch unit 20 to switch off again; in that way, the cycles continue on, so that the current flows through the damping component R1 and the damping component R2 continuously; thus, the damping component R1 and the damping component R2 generate heat, and thereby heat up the first battery E1 and the second battery E2 until the heating process is completed.

By adding a capacitor C2 in the heating circuit, two charging/discharging circuits are formed at the same time in each working cycle, and therefore the first battery E1 and the second battery E2 are always in a charging/discharging process, and the current always flows through the damping component R1 and the damping component R2; thus, the heating time can be shortened, according to certain embodiments.

FIG. 11 is a circuit diagram of one embodiment of the switch unit in the heating circuit provided in the present invention. As shown in FIG. 11, the first switch unit 10 and/or the second switch unit 20 can comprise a switch K11 and a one-way semiconductor component D11 connected in parallel with the switch K11 in reverse direction, wherein: the switching control module 100 is electrically connected with the switch K11, and is configured to control ON/OFF of the forward direction branches of the first switch unit 10 and/or the second switch unit 20 by controlling ON/OFF of the switch K11. The ON/OFF control of switch K11 can be performed in the grid zone shown in FIG. 3, FIG. 5, FIG. 8 and FIG. 10. In FIG. 5 and FIG. 10, when or after the current flowing through the first switch unit 10 or the second switch unit 20 reaches zero, the switching control module 100 can control the first switch unit 10 or the second switch unit 20 to switch off respectively.

Certain embodiments of the present invention provide a battery heating circuit, wherein: the battery comprises a first battery and a second battery; the heating circuit comprises a first switch unit, a second switch unit, a damping component R1, a damping component R2, a current storage component L3, a current storage component L4, a switching control module and an energy storage component V1; the first battery, the damping component R1, the current storage component L3, the energy storage component V1 and the first switch unit are connected in series to constitute a first charging/discharging circuit; the second battery, the damping component R2, the current storage component L4, the energy storage component V1 and the second switch unit are connected in series to constitute a second charging/discharging circuit; when the energy storage component V1 is charged or discharges, the direction of charging/discharging current in the second charging/discharging circuit is opposite to the direction of charging/discharging current in the first charging/discharging circuit; the switching control module is electrically connected with the first switch unit and the second switch unit, and is configured to control the first switch unit and the second switch unit to switch on alternately, so as to control the electric energy to flow between the first battery, the energy storage component V1 and the second battery. The battery heating circuit of certain embodiments of the present invention can achieve high heating efficiency.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits.

While some embodiments of the present invention are described above with reference to the accompanying drawings, the present invention is not limited to the details of those embodiments. Those skilled in the art can make modifications and variations, without departing from the spirit of the present invention. However, all these modifications and variations shall be deemed as falling into the scope of the present invention.

In addition, it should be noted that the specific technical features described in the above embodiments can be combined in any appropriate way, provided that there is no conflict. To avoid unnecessary repetition, certain possible combinations are not described specifically. Moreover, the different embodiments of the present invention can be combined as needed, as long as the combinations do not deviate from the spirit of the present invention. However, such combinations shall also be deemed as falling into the scope of the present invention.

Hence, although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A circuit for heating a first battery and a second battery, the circuit comprising:
   the first battery including a first damping component and a first current storage component, the first damping component and the first current storage component being parasitic to the first battery;

the second battery including a second damping component and a second current storage component, the second damping component and the second current storage component being parasitic to the second battery;

a first switch unit;

a second switch unit;

a switching control component coupled to the first switch unit and the second switch unit; and a first energy storage component including a first storage terminal and a second storage terminal, the first storage terminal being coupled to a first negative terminal of the first battery through the first switch unit, the second storage terminal being coupled to a second negative terminal of the second battery through the second switch unit;

wherein:
the first battery, the first switch unit, and the first energy storage component are connected to form a first charging and discharging circuit; and
the second battery, the second switch unit, and the first energy storage component are connected to form a second charging and discharging circuit;

wherein:
the switching control component is configured to turn on the first switch unit and the second switch unit alternately so as to control a first current flowing between the first battery and the first energy storage component and a second current flowing between the second battery and the first energy storage component; and
the circuit for heating the first battery and the second battery is configured to heat the first battery and the second battery by at least discharging the first battery and discharging the second battery.

2. The circuit of claim 1 wherein the circuit for heating the first battery and the second battery is further configured to charge the first energy storage component with the first current flowing in a first direction and with the second current flowing in a second direction, the first direction and the second direction being opposite to each other.

3. The circuit of claim 1 wherein:
the first damping component is a first parasitic resistor of the first battery;
the first current storage component is a first parasitic inductor of the battery;
the second damping component is a second parasitic resistor of the second battery; and
the second current storage component is a second parasitic inductor of the battery.

4. The circuit of claim 1 wherein the first energy storage component includes an inductor.

5. The circuit of claim 4 wherein the switching control component is configured to turn on the first switch unit and turn off the second switch unit in response to an inductor current flowing though the inductor reaches a predetermined value in magnitude.

6. The circuit of claim 4 wherein the switching control component is configured to turn off the first switch unit and turn on the second switch unit in response to an inductor current flowing though the inductor reaches a predetermined value in magnitude.

7. The circuit of claim 1 wherein the first energy storage component includes a capacitor.

8. The circuit of claim 7 wherein the switching control component is configured to turn on the first switch unit and turn off the second switch unit in response to a capacitor current flowing to the capacitor reaches zero in magnitude twice.

9. The circuit of claim 7 wherein the switching control component is configured to turn off the first switch unit and turn on the second switch unit in response to a capacitor current flowing to the capacitor reaches zero in magnitude twice.

10. The circuit of claim 1, and further comprising:
a second energy storage component;
wherein:
the first battery, the second switch unit, and the second energy storage component are connected to form a third charging and discharging circuit; and
the second battery, the first switch unit, and the second energy storage component are connected to form a fourth charging and discharging circuit;
wherein the switching control component is configured to turn on the first switch unit and the second switch unit alternately so as to control a third current flowing between the first battery and the second energy storage component and a fourth current flowing between the second battery and the second energy storage component.

11. The circuit of claim 10 wherein the circuit for heating the first battery and the second battery is further configured to charge the second energy storage component with the third current flowing in a third direction and with the fourth current flowing in a fourth direction, the third direction and the fourth direction being opposite to each other.

12. The circuit of claim 10 wherein:
the first energy storage component includes a first inductor; and
the second energy storage component includes a second inductor.

13. The circuit of claim 12 wherein the switching control component is configured to turn on the first switch unit and turn off the second switch unit in response to a first inductor current flowing though the first inductor or a second inductor current flowing through the second inductor reaches a predetermined value in magnitude.

14. The circuit of claim 12 wherein the switching control component is configured to turn off the first switch unit and turn on the second switch unit in response to a first inductor current flowing though the first inductor or a second inductor current flowing through the second inductor reaches a predetermined value in magnitude.

15. The circuit of claim 10 wherein:
the first energy storage component includes a first capacitor; and
the second energy storage component includes a second capacitor.

16. The circuit of claim 15 wherein the switching control component is configured to turn on the first switch unit and turn off the second switch unit in response to a first capacitor current flowing to the first capacitor or a second capacitor current flowing to the second capacitor reaches zero in magnitude twice.

17. The circuit of claim 15 wherein the switching control component is configured to turn off the first switch unit and turn on the second switch unit in response to a first capacitor current flowing to the first capacitor or a second capacitor current flowing to the second capacitor reaches zero in magnitude twice.

18. The circuit of claim 1 wherein:

the first switch unit includes a first switch and a first one-way semiconductor component connected in parallel with the first switch; and the switching control component is coupled to the first switch and configured to turn on and off the first switch respectively.

19. The circuit of claim 18 wherein:

the second switch unit includes a second switch and a second one-way semiconductor component connected in parallel with the second switch; and the switching control component is coupled to the second switch and configured to turn on and off the second switch respectively.

20. The circuit of claim 1 is further configured to:

start heating the first battery and the second battery if at least one heating start condition is satisfied; and stop heating the first battery and the second battery if at least one heating stop condition is satisfied.

* * * * *